UNITED STATES PATENT OFFICE.

WILLIAM W. BENNETT AND CHARLES S. PILKINGTON, OF WESTERVILLE, OHIO.

COMPOSITION FOR COATING MOLDS FOR CONCRETE.

1,004,844.     Specification of Letters Patent.     Patented Oct. 3, 1911.

No Drawing.     Application filed November 4, 1910. Serial No. 590,605.

*To all whom it may concern:*

Be it known that we, WILLIAM W. BENNETT and CHARLES S. PILKINGTON, citizens of the United States, residing at Westerville, in the county of Franklin and State of Ohio, have invented a new and useful Composition for Coating Molds for Concrete, of which the following is a specification.

Our composition consists of the following ingredients, combined substantially in the proportions stated, viz., Gasolene _____ 80%
    Resin _____ 14%
    Naphthalene (crystals) _____ 6%

These ingredients are thoroughly mingled by agitation, the naphthalene crystals and resin being dissolved to form in conjunction with the gasolene, a liquid product.

In utilizing the above named composition, the liquid formed as described, is applied in the form of a thin coating to those surfaces of the mold which are to come into contact with the cement or concrete, which is molded therein. It will be obvious that the coating thus applied, will, owing to its composition be substantially transparent and in the nature of a thin glaze.

By the use of the above composition, the cement is prevented from adhering to the surfaces of the molds, thus insuring the production of smooth, clean molded surfaces.

As a substitute for the gasolene element of our composition, it will be understood that we may employ grain or wood alcohol, benzin, or naphtha and as a substitute for the resin, paraffin, gum shellac or gum lacquer might be employed, these elements being regarded as equivalents of the gasolene and resin. It is also obvious that any well known or suitable coloring material, may be added to the composition if desired.

We claim:

The herein described composition of matter for coating cement molds, consisting of gasolene 80%, resin 14%, naphthalene (crystals) 6%, substantially as described and for the purpose specified.

In testimony whereof we affix our signatures in presence of two witnesses.

WILLIAM W. BENNETT.
    CHARLES S. PILKINGTON.

Witnesses:
    GEORGE L. STOUGHTON,
    W. MONTZ.